United States Patent
Abe et al.

(10) Patent No.: US 9,313,774 B2
(45) Date of Patent: Apr. 12, 2016

(54) SIGNALING METHOD OF CSI-RS LOCATION INDEXES INDICATIVE OF CSI-RS LOCATION POSITIONS IN A RESOURCE BLOCK AND BASE STATION APPARATUS

(75) Inventors: Tetsushi Abe, Tokyo (JP); Nobuhiko Miki, Tokyo (JP); Yusuke Ohwatari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 401 days.

(21) Appl. No.: 13/816,749

(22) PCT Filed: Aug. 16, 2011

(86) PCT No.: PCT/JP2011/068546
§ 371 (c)(1),
(2), (4) Date: Mar. 20, 2013

(87) PCT Pub. No.: WO2012/023550
PCT Pub. Date: Feb. 23, 2012

(65) Prior Publication Data
US 2013/0176978 A1 Jul. 11, 2013

(30) Foreign Application Priority Data

Aug. 16, 2010 (JP) ................................. 2010-181867

(51) Int. Cl.
*H04W 4/00* (2009.01)
*H04W 72/04* (2009.01)
*H04L 5/00* (2006.01)

(52) U.S. Cl.
CPC ............. *H04W 72/04* (2013.01); *H04L 5/0048* (2013.01); *H04L 5/0098* (2013.01)

(58) Field of Classification Search
CPC ....................................................... H04W 72/04
See application file for complete search history.

(56) References Cited

U.S. PATENT DOCUMENTS

| | | | |
|---|---|---|---|
| 8,494,006 B2 * | 7/2013 | Lee ................................. | 370/203 |
| 8,665,972 B2 * | 3/2014 | Kim et al. ...................... | 375/260 |
| 2011/0194551 A1 * | 8/2011 | Lee et al. ....................... | 370/342 |
| 2011/0305295 A1 * | 12/2011 | Kim et al. ..................... | 375/295 |

OTHER PUBLICATIONS

International Search Report issued in PCT/JP2011/068546 mailed Nov. 8, 2011 (4 pages).

(Continued)

Primary Examiner — Maharishi Khirodhar
(74) Attorney, Agent, or Firm — Osha Liang LLP

(57) ABSTRACT

To signal CSI-RS location indexes indicative of CSI-RS location positions in a resource block with high efficiency, a signaling method of CSI-RS is characterized by having the steps of locating a CSI-RS that is a reference signal for downlink channel estimation in resources for CSI-RS reserved to transmit the CSI-RS, generating a CSI-RS location index indicative of a location position of the CSI-RS located in the resources for CSI-RS, in the CSI-RS location index an index pattern varies corresponding to the number of CSI-RS ports so that an index pattern of the relatively low number of CSI-RS ports is a subset of an index pattern of the relatively high number of CSI-RS ports, and transmitting the generated CSI-RS location index to a mobile terminal apparatus.

10 Claims, 16 Drawing Sheets

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).
NTT DOCOMO, "Signaling to Support CSI-RS", 3GPP TSG RAN WG1 Meeting #62, R1-104930, Madrid, Spain, Aug. 23-27, 2010, (10 pages).

Notification of Reasons for Rejection in corresponding Japanese application No. 2010-181867 dated May 21, 2013 (4 pages).
Decision to Grant a Patent in corresponding Japanese application No. 2010-181867 dated Jul. 30, 2013 (4 pages).
Nokia, Nokia Seimens Networks; "Multi-cell CSI-RS design aspects"; 3GPP TSG-RAN WG1 Meeting #58bis, R1-093909; Miyazaki, Japan; Oct. 12-16, 2009.
NTT DOCOMO; "Intra-cell CSI-RS Design"; 3GPP TSG RAN WG1 Meeting #61bis, R1-104199; Dresden, Germany; Jan. 28-Jul. 2, 2010 (7 pages).

* cited by examiner

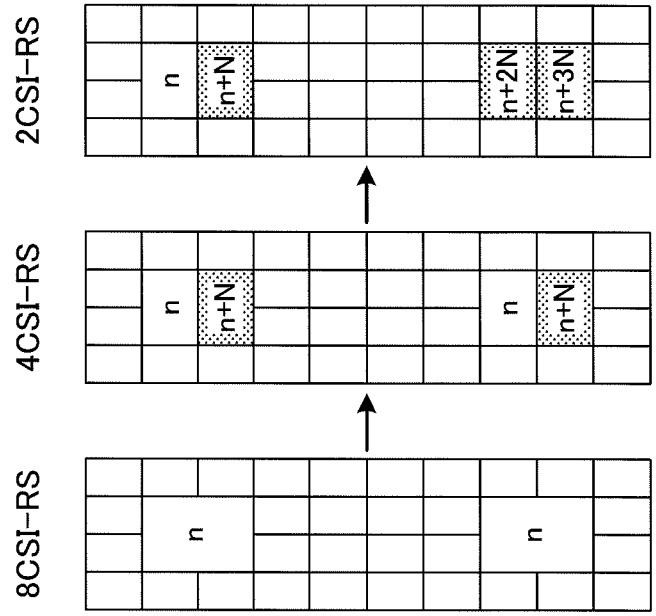
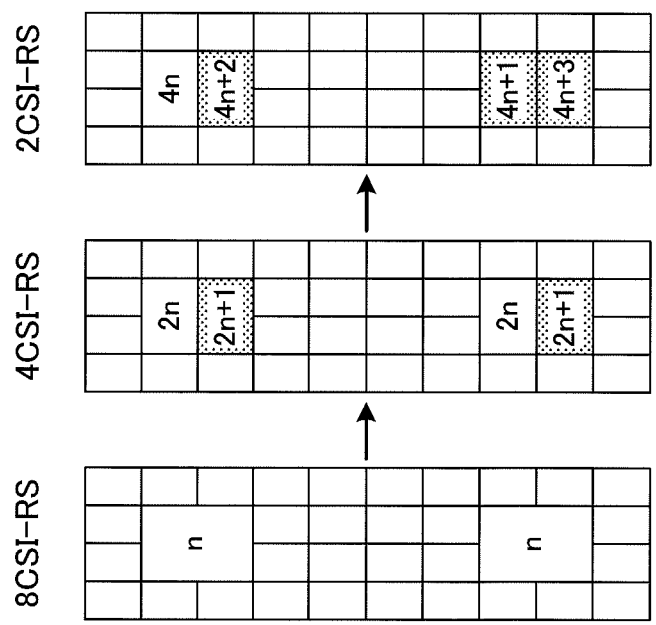
FIG.3B
FIG.3A

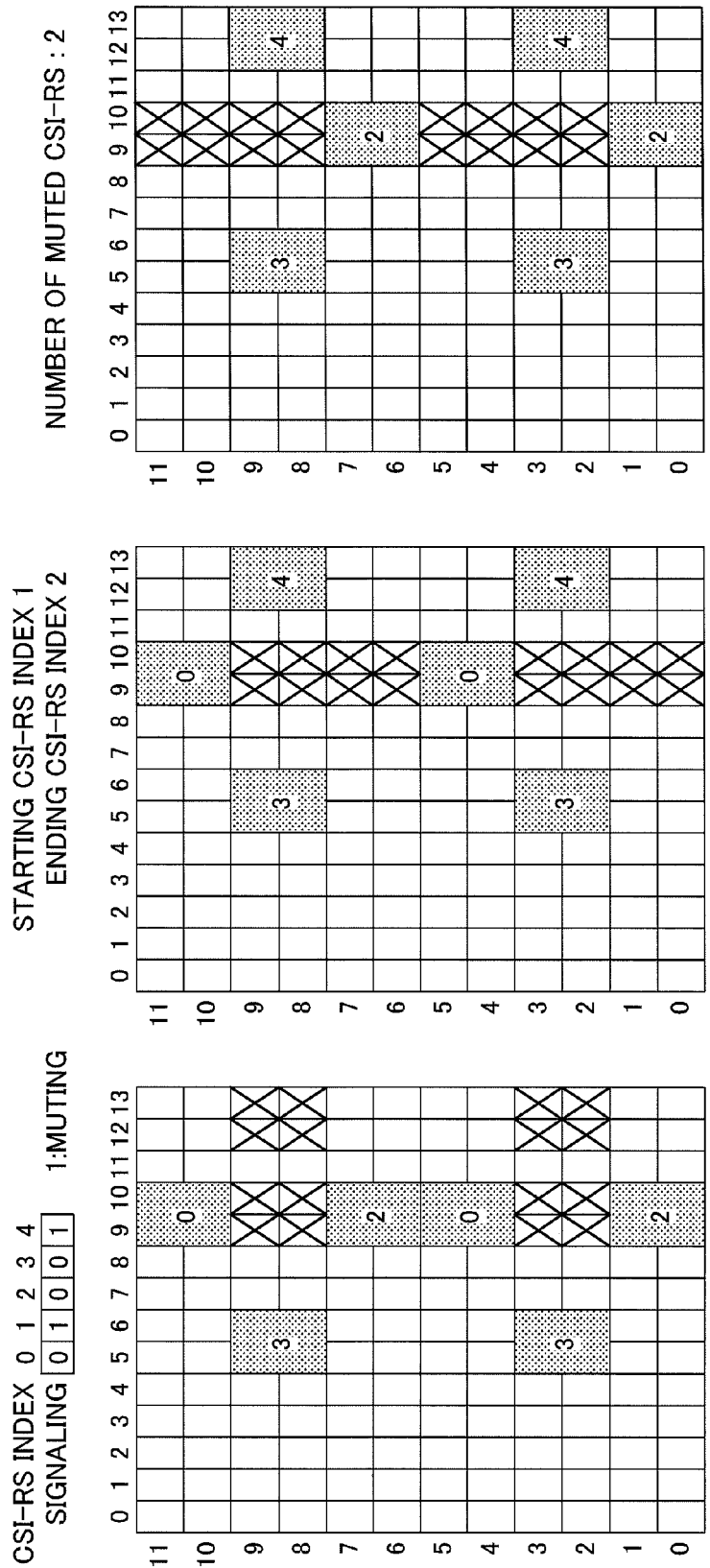

TABLE 1-NUMBER OF SIGNALING BITS, NUMBER OF RATE MATCHING AND RE MAPPING PATTERNS

| | SIGNALING METHODS | NUMBER OF SIGNALING BITS | NUMBER OF RATE MATCHING PATTERN | NUMBER OF RE MAPPING PATTERN |
|---|---|---|---|---|
| 2CSI-RS PORT | BITMAP-BASED | 20 | 19 | 1048575 |
| | TREE-BASED | 8 | 19 | 210 |
| | NUMBER-BASED | 5 | 19 | 20 |
| 4CSI-RS PORT | BITMAP-BASED | 10 | 9 | 1023 |
| | TREE-BASED | 6 | 9 | 55 |
| | NUMBER-BASED | 4 | 9 | 10 |
| 8CSI-RS PORT | BITMAP-BASED | 5 | 4 | 31 |
| | TREE-BASED | 4 | 4 | 15 |
| | NUMBER-BASED | 3 | 4 | 5 |

FIG.8

TABLE2 – EXAMPLE OF SIGNALING OF DUTY CYCLE AND SUBFRAME OFFSET

| $I_{cycle, offset}$ | DUTY CYCLE | SUBFRAME OFFSET |
|---|---|---|
| $I_{cycle, offset} \leq 4$ | 5 | $I_{cycle, offset}$ |
| $5 \leq I_{cycle, offset} \leq 14$ | 10 | $I_{cycle, offset} - 5$ |
| $15 \leq I_{cycle, offset} \leq 34$ | 20 | $I_{cycle, offset} - 15$ |
| $35 \leq I_{cycle, offset} \leq 54$ | 40 | $I_{cycle, offset} - 35$ |
| $55 \leq I_{cycle, offset} \leq 94$ | 80 | $I_{cycle, offset} - 55$ |
| $95 \leq I_{cycle, offset} \leq 174$ | 160 | $I_{cycle, offset} - 95$ |

FIG.14

SIGNALING METHOD OF CSI-RS LOCATION INDEXES INDICATIVE OF CSI-RS LOCATION POSITIONS IN A RESOURCE BLOCK AND BASE STATION APPARATUS

CROSS REFERENCE TO RELATED APPLICATIONS

This application is a national stage application of PCT/JP2011/068546 filed Aug. 16, 2011, which claims priority to Japanese Priority Application No. 2010-181867 filed on Aug. 16, 2010, the entire contents of which are hereby incorporated by reference.

TECHNICAL FIELD

The present invention relates to a signaling method of CSI-RS and base station apparatus.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Document 1).

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). Accordingly, it is expected that such a plurality of mobile communication systems coexists in the future, and it is conceivable that configurations (base station apparatus, mobile terminal apparatus and the like) capable of supporting the plurality of systems are needed.

In downlink of systems (LTE systems) of LTE, CRS (Common Reference Signal) that is a reference signal common to the cell is defined. The CRS is used in demodulation of transmission data, and is also used in measurement of channel quality (CQI: Channel Quality Indicator) of downlink for scheduling and adaptive control, and measurement (mobility measurement) of downlink propagation path states in an average manner for cell search and handover.

Meanwhile, in downlink of systems (LTE-A systems) of LTE Advanced is defined CSI-RS (Channel State Information-Reference Signal) dedicated to CQI measurement, in addition to the CRS.

PRIOR ART DOCUMENT

Non-Patent Document

[Non-patent Document 1] 3GPP, TR25.912 (V7.1.0), "Feasibility study for Evolved UTRA and UTRAN", September 2006

DISCLOSURE OF INVENTION

Problems to be Solved by the Invention

In addition, with introduction of CSI-RS, location configurations of CSI-RS (CSI-RS locations) are studied, and since the number of required CSI-RSs varies according to the number of CSI-RS ports, location patterns vary corresponding thereto.

The present invention was made in view of such a respect, and it is an object of the invention to provide a signaling method of CSI-RS and base station apparatus to signal CSI-RS location indexes indicative of CSI-RS location positions in a resource block with high efficiency.

Means for Solving the Problem

A base station apparatus of the invention is characterized by having a locating section that locates a CSI-RS that is a reference signal for downlink channel estimation in resources for CSI-RS reserved to transmit the CSI-RS, an index generating section which generates a CSI-RS location index indicative of a location position of the CSI-RS located in the resources for CSI-RS in the locating section, and at this point, generates CSI-RS location indexes varying corresponding to the number of CSI-RS ports so that an index pattern of the relatively low number of CSI-RS ports is a subset of an index pattern of the relatively high number of CSI-RS ports, and a transmission section that transmits the CSI-RS location indexes generated in the index generating section to a mobile terminal apparatus.

Advantageous Effect of the Invention

According to the invention, it is possible to provide a signaling method of CSI-RS and base station apparatus to signal CSI-RS location indexes indicative of location positions of CSI-RSs in a resource block with high efficiency.

BRIEF DESCRIPTION OF DRAWINGS

FIG. 3 contains explanatory views to explain a generation process of CSI-RS location indexes;

FIG. 7 contains explanatory views of a signaling method of muting resources;

FIG. 8 is a table illustrating the relationship between the signaling method of muting resources and the number of signaling bits;

FIG. 14 is a table showing the correspondence relationship between a transmission cycle of CSI-RS and subframe offset.

BEST MODE FOR CARRYING OUT THE INVENTION

Before describing a high efficient signaling method of CSI-RS according to invention, described first are CRS (Common Reference Signal) defined in downlink of LTE systems, and CSI-RS (Channel State Information-Reference Signal) of which application to downlink in LTE-A systems was agreed. FIG. 1 contains views to explain a configuration of CRS. FIG. 1 contains explanatory views of a location configuration of CRS. The CRS is assigned to all resource blocks and all subframes.

The CRS is transmitted to a mobile terminal apparatus with a predetermined frequency, time, transmission power and phase as a cell common reference signal. The frequency and transmission power of the CRS is recognized on the mobile terminal apparatus side by a cell ID (area identifier) and broadcast signal, described later. The CRS is substantially used in demodulation of user data and downlink channel measurement in the mobile terminal apparatus. Channel measurement using the CRS includes measurement of channel quality (CQI: Channel Quality Indicator) of downlink for scheduling and adaptive control, and measurement (mobility measurement) of downlink propagation path states in an average manner for cell search and handover.

Figure 1A:
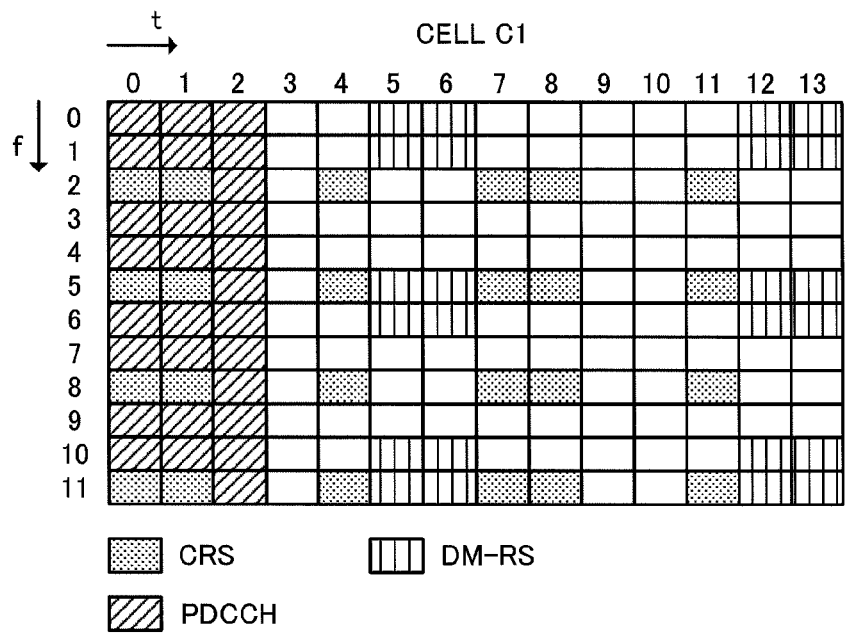
FIG. 1 contains explanatory views of a location configuration of CRS.
Figure 1B:
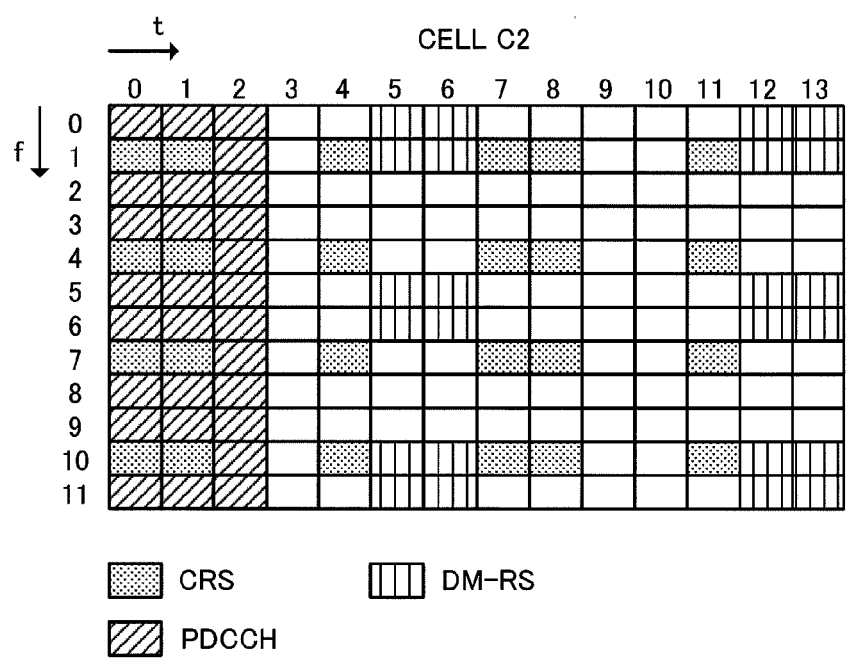

As shown in FIG. 1A, the CRS is located not to overlap user data and DM-RS (Demodulation-Reference Signal) in one resource block specified in LTE. One resource block is comprised of 12 subcarriers contiguous in the frequency domain, and 14 symbols contiguous in the time-axis direction. Further, as shown in FIG. 1B, the CRS is shifted in the frequency domain for each cell, and is capable of being set so that a collision of simultaneous CRSs does not occur between adjacent cells. In an example as shown in FIG. 1, the CRS in a cell C2 is shifted by one subcarrier in the frequency domain with reference to the CRS in a cell 1 and mapped.

The CRS is identified by parameters of the position, sequence and transmission power. Among the parameters, the position of the CRS is associated with a cell ID. In other words, the position of the CRS shifted in the frequency domain is determined by the cell ID, and therefore, the mobile terminal apparatus recognizes the cell ID of the existing cell and thereby identifies the location configuration of CRS. Further, the sequence of the CRS is associated with the cell ID, and transmission power is notified by a broadcast signal. In addition, the cell ID to identify the position and sequence of the CRS is recognized by the mobile terminal apparatus by a cell search.

Described next is the CSI-RS configuration considered in downlink of LTE-A systems. The CRS is assigned to all resource blocks and all subframes, and the CSI-RS is assigned at predetermined intervals. Further, in consideration of transmission and reception of data channel signals by CoMP, the CSI-RS is designed with consideration given to using CQI measurement of not only a serving cell but also adjacent cells. Meanwhile, as in the CRS, the CSI-RS is identified by parameters of the position, sequence and transmission power. Among the parameters, the position of the CSI-RS is capable of being notified using a broadcast signal of each cell (RRC signaling). When the position of the CSI-RS is notified using a broadcast signal, the mobile terminal apparatus receives the broadcast signal from the base station apparatus, and is thereby capable of identifying the position of the CSI-RS.

Figure 2:
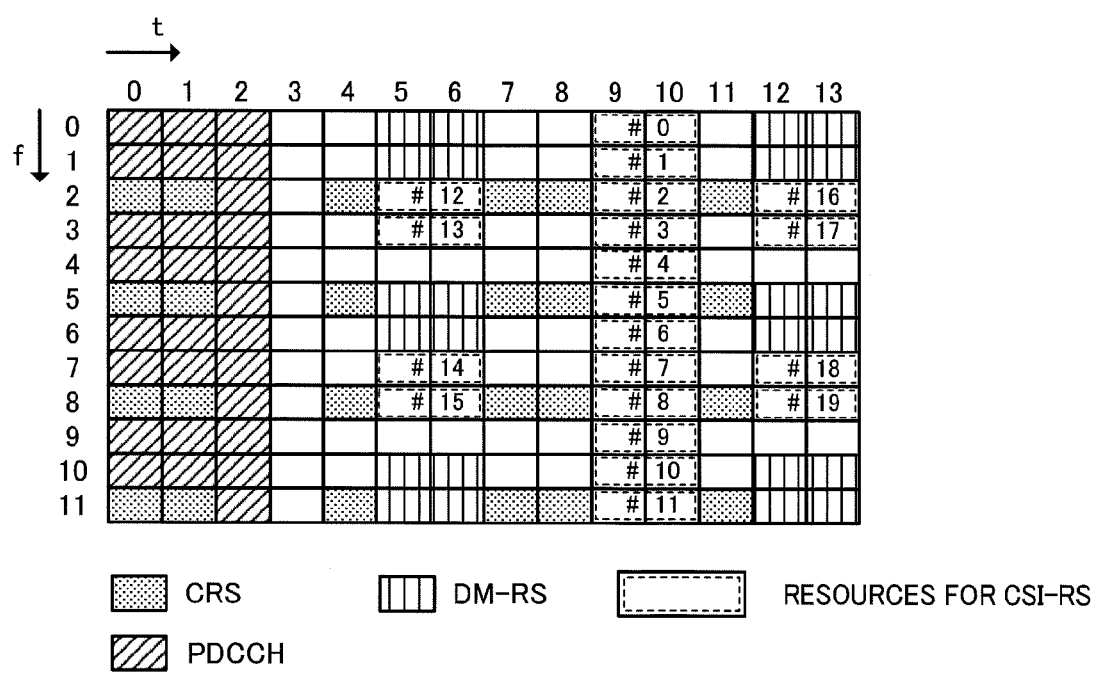
FIG. 2 is an explanatory view of a location configuration of CSI-RS.

FIG. 2 is a view to explain a location configuration of CRI-RS. The CSI-RS is located not to overlap user data and DM-RS in one resource block specified in LTE. For 8 CSI-RSs (the case where the number of CSI-RS ports is "8" corresponding to 8 antennas), the CSI-RS configuration as shown in FIG. 2 is agreed. From the viewpoint of suppressing the PAPR, as resources allowed to transmit the CSI-RS, two resource elements adjacent in the time-axis direction are assigned as a set. Two resource elements adjacent in the time-axis direction are always used as a set, and therefore, it is desired that one index (CSI-RS location index) is assigned to a set of two resource elements.

In the CSI-RS configuration as shown in FIG. 2, 40 resource elements are reserved as CSI-RS transmission resources. Since one index is assigned to a set of two resource elements as described above, the CSI-RS location positions are capable of being indicated by maximum 20 indexes of numbers 0 to 19 in entire one resource block.

When the number of CSI-RS ports is "8", 8 resource elements are assigned to CSI-RSs among 40 elements (#0 to #19). In the CSI-RS configuration as shown in FIG. 2, it is possible to select any one of 5 patterns (indexes 0 to 4) shown in 8 CSI-RS of FIG. 4A(a). The resource elements forming one pattern are provided with the same index. The index thus given to resources to transmit the CSI-RS is called the CSI-RS location index. In an example of FIG. 4A(a), 8 resource elements (#0, #1 in FIG. 2) (#6, #7 in FIG. 2) are provided with CSI-RS location index "0". When the number of CSI-RS ports is "8", 3 bits are required to signal CSI-RS location indexes #0 to #4.

When the number of CSI-RS ports is "4", 4 resource elements are assigned to CSI-RSs among 40 resource elements. It is possible to select any one of 10 patterns (indexes 0 to 9) shown in 4 CSI-RS in FIG. 4A(b). When the number of CSI-RS ports is "4", 4 bits are required to signal CSI-RS location indexes #0 to #9.

When the number of CSI-RS ports is "2", 2 resource elements are assigned to CSI-RSs among 40 resource elements (#0 to #19). It is possible to select any one of 20 patterns (indexes 0 to 19) shown in 2 CSI-RS in FIG. 4A(c). When the number of CSI-RS ports is "2", 5 bits are required to signal CSI-RS location indexes #0 to #19.

Figure 4A:
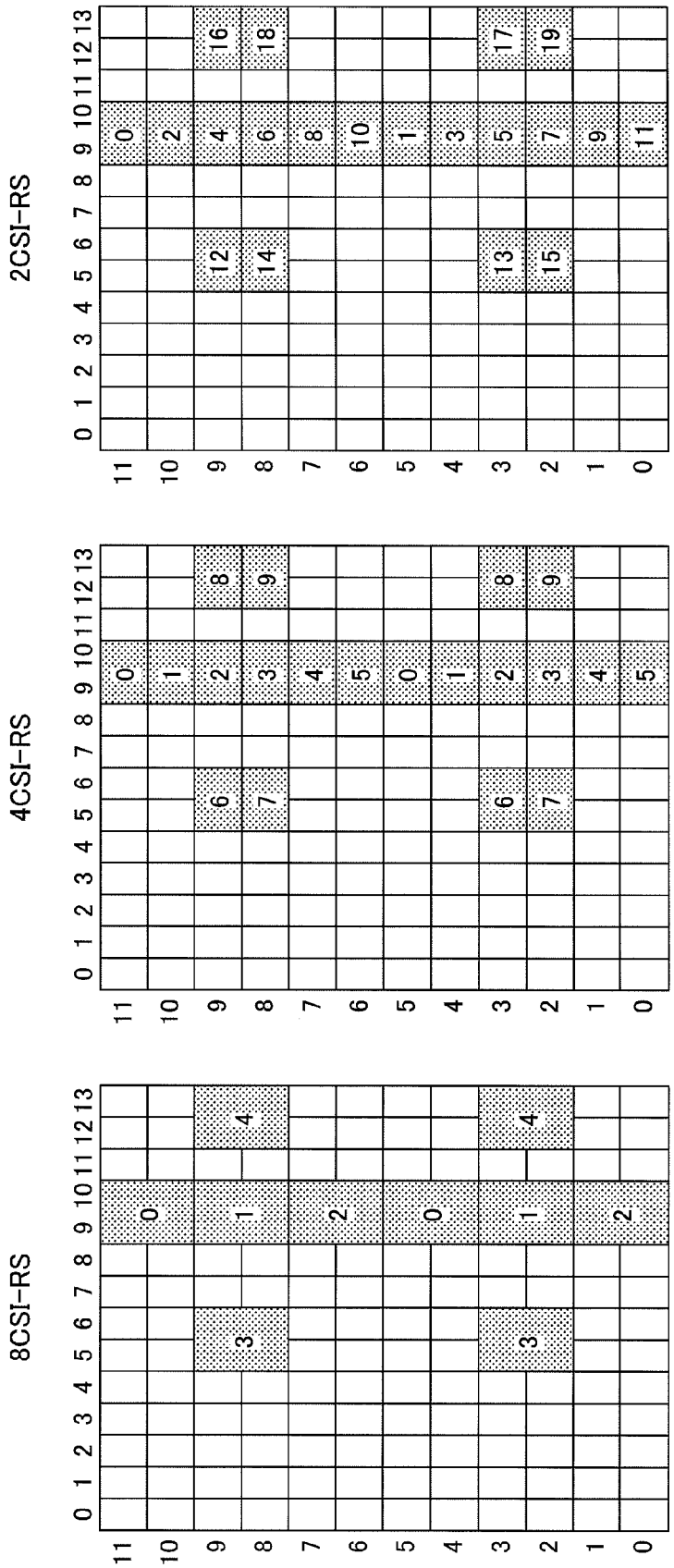
FIG. 4A contains views showing a specific example in which CSI-RS location indexes are determined by applying the method as shown in FIG. 3A.

In order to thus support all the numbers of CSI-RS ports of "2", "4" and "8", to signal the CSI-RS location indexes, it is necessary to provide index tables for defining CSI-RS location indexes for each of the numbers of CSI-RS ports of "2", "4" and "8" as shown in FIG. 4A.

Therefore, as a result of studying methods for signaling CSI-RS location indexes with efficiency, the inventors of the present invention found out that it is possible to generate CSI-RS location indexes without having index tables for the numbers of CSI-RS ports of "4" and "2", by generating CSI-RS location indexes of the lower number of CSI-RS ports using CSI-RS location indexes of the high number of CSI-RS ports so that an index pattern of the relatively low number of CSI-RS ports is a subset of an index pattern of the relatively high number of CSI-RS ports, and that it is thereby possible to signal CSI-RS location indexes with high efficiency, and arrived at the invention.

FIGS. 3A and 3B are conceptual diagrams of the signaling method of CSI-RS location indexes according to the invention. In the figures, using 2×2 resource elements (hereinafter, referred to as an REB: Resource Element Block) as one unit, two REBs for CSI-RS are shown. One REB for CSI-RS is comprised of upper resources and lower resources.

FIG. 3A is a conceptual diagram of generation concept and signaling method of CSI-RS location indexes. FIG. 3A shows regions of front and back 4 symbols including 2 symbols assigned the REB for CSI-RS. When the number of CSI-RS ports is "8" (8 antennas), the same CSI-RS location index "n" is assigned to two REBs (total 8 resource elements) for CSI-RS.

When the number of CSI-RS ports is "4" (4 antennas), CSI-RS location indexes are designed to be uniquely determined, by an index determination rule, from the index "n" of the number of CSI-RS ports of "8" that is higher. In this example, the same index determination rule is applied to two REBs for CSI-RS. More specifically, within one REB for CSI-RS, CSI-RS location indexes assigned to the upper resources are assigned "2n" that is [a value obtained by doubling] the CSI-RS location index "n" of the number of CSI-RS ports of "8". The lower resources are assigned "2n+1" that is [a value obtained by adding "1" to the value obtained by doubling] the CSI-RS location index "n" of the number of CSI-RS ports of "8". CSI-RS location indexes are assigned to the other CSI-RS REB by the same rule.

When the number of CSI-RS ports is "2" (2 antennas), CSI-RS location indexes are determined, by the index determination rule, from CSI-RS location indexes of the case where the number of CSI-RS ports is "4". More specifically, for an REB for CSI-RS of higher frequency indexes (the frequency index increases as the REB is present in an upper position in the figure in FIG. 3A), the upper resources are assigned "4n" that is [a value obtained by doubling] the corresponding CSI-RS location index "2n" of the number of CSI-RS ports of "4". Further, the lower resources are assigned "4n+2" that is [a value obtained by doubling] the corresponding CSI-RS location index "2n+1" of the number of CSI-RS ports of "4". Meanwhile, for an REB for CSI-RS of lower frequency indexes, the upper resources are assigned "4n+1" that is [a value obtained by adding "1" to the value obtained by doubling] the corresponding CSI-RS location index "2n" of the number of CSI-RS ports of "4". Further, the lower resources are assigned "4n+3" that is [a value obtained by adding "1" to the value obtained by doubling] the corresponding CSI-RS location index "2n+1" of the number of CSI-RS ports of "4".

FIG. 3B is a conceptual diagram of another generation concept and signaling method of CSI-RS location indexes. The method is the same as the signaling method as shown in FIG. 3A in the respect of determining CSI-RS location indexes of the case where the number of CSI-RS ports is "4" from the CSI-RS location indexes of the number of CSI-RS ports of "8" that is higher, according to an index determination rule. In this index generation and signaling method, for one of REBs for CSI-RS, CSI-RS location indexes assigned to upper resources are assigned "n" that is [the same value, without any modification] as the CSI-RS location index "n" of the number of CSI-RS ports of "8". The lower resources are assigned "n+N" that is [a value obtained by adding N to the same value] as the CSI-RS location index "n" of the number of CSI-RS ports of "8". Herein, N represents the maximum value n (i.e. 10/5) of the case where the number of CSI-RS ports is 4/8. CSI-RS location indexes are assigned to the other REB for CSI-RS by the same rule.

CSI-RS location indexes of the case where the number of CSI-RS ports is "2" is determined from CSI-RS location indexes of the case where the number of CSI-RS ports is "4", according to an index determination rule. More specifically, for an REB for CSI-RS of higher frequency indexes, the upper resources are assigned "n" that is [the same value, without any modification] as the corresponding CSI-RS location index "n" of the number of CSI-RS ports of "4". Further, the lower resources are assigned "n+N" that is [the same value, without any modification] as the corresponding CSI-RS location index "n+N" of the number of CSI-RS ports of "4". Meanwhile, for an REB for CSI-RS of lower frequency indexes, the upper resources are assigned "n+2N" that is [a value obtained by adding 2N to the same value] as the corresponding CSI-RS location index "n" of the number of CSI-RS ports of "4". Further, the lower resources are assigned "n+3N" that is [a value obtained by adding 2N to the same value] as the corresponding CSI-RS location index "n+N" of the number of CSI-RS ports of "4".

After determining transmission positions of CSI-RSs in a resource block, the base station apparatus determines CSI-RS location indexes of the determined CSI-RS transmission positions by applying the method as shown in FIG. 3A. In other words, in the case of 8 CSI-RSs where the number of CSI-RS ports is the maximum, the apparatus refers to the beforehand defined index pattern as shown in FIG. 4A(a), and generates the CSI-RS location index assigned to the resources. Meanwhile, in the case of 4 CSI-RSs or 2 CSI-RSs where the number of CSI-RS ports is relatively low, by applying the method as shown in FIG. 3A, the apparatus generates CSI-RS location indexes such that the index pattern of the relatively low CSI-RS ports is a subset of the index pattern of the relatively high number of CSI-RS ports. Accordingly, according to the CSI-RS signaling method of the invention, as long as the apparatus holds the CSI-RS location index table of the number of CSI-RS ports of "8" that is a basic index pattern, it is possible to determine CSI-RS location indexes associated with the numbers of CSI-RS ports being "4" and "2", and the need is eliminated for holding CSI-RS location index tables of the numbers of CSI-RS ports being "4" and "2". Further, as compared with the case of providing all resource elements in a resource block with indexes to signal, the maximum value of indexes can be decreased, and it is thereby possible to reduce signaling overhead.

FIG. 4A shows a specific example for determining CSI-RS location indexes of the numbers of CSI-RS ports being "4" and "2" by applying the method as shown in FIG. 3A. CSI-RS location indexes of 8 CSI-RSs where the number of ports is the maximum are beforehand determined, and are held in the form of a table or the like. Based on the index pattern of 8 CSI-RSs, indexes of the numbers of CSI-RS ports being "4" and "2" are calculated according to the index determination rule as shown in FIG. 3A.

As shown in the figure, in one resource block, it is assumed that six REBs (hereinafter, referred to as 1st to 6th REBs) for CSI-RS are located in the 9th and 10th symbol regions, two REBs (hereinafter, referred to as 7th and 8th REBs) for CSI-RS are located in the 5th and 6th symbol regions, and that two REBs (hereinafter, referred to as 9th and 10th REBs) for CSI-RS are located in the 12th and 13th symbol regions.

In the case of 8 CSI-RSs, CSI-RS location index "0" is assigned to the 1st and 4th REBs located in the 9th and 10th symbol regions, CSI-RS location index "1" is assigned to the 2nd and 5th REBs located in the same symbol regions, and further, CSI-RS location index "2" is assigned to the remaining 3rd and 6th REBs. Meanwhile, CSI-RS location index "3" is assigned to the 7th and 8th REBs located in the 5th and 6th symbol regions, and CSI-RS location index "4" is assigned to the 9th and 10th REBs located in the 12th and 13th symbol regions. The CSI-RS location index pattern of 8 CSI-RSs is beforehand held.

In the case of 4 CSI-RSs, CSI-RS location indexes are determined based on the CSI-RS location indexes assigned to REBs of 8 CSI-RSs in which the number of ports is higher than in 4 CSI-RSs. In the case of 4 CSI-RSs, different CSI-RS location indexes are assigned to upper resources and lower resources in one REB, and in a set of REBs (for example, 1st REB and 4th REB) assigned the same CSI-RS location index in 8 CSI-RSs, the same CSI-RS location indexes (2n=0, 2n+1=1) are assigned also in 4 CSI-RSs.

In the case of 2 CSI-RSs, CSI-RS location indexes are determined based on the CSI-RS location indexes assigned to REBs of 4 CSI-RSs in which the number of ports is higher than in 2 CSI-RSs. In the case of 2 CSI-RSs, different CSI-RS location indexes are assigned to upper resources and lower resources in one REB, and also in a set of REBs (for example, 1st REB and 4th REB) assigned the same CSI-RS location indexes in 4 CSI-RSs, different location indexes are assigned. For example, in the 1st REB, "4n=0" is assigned to upper resources, and "4n+2=2" is assigned to lower resources. In the 4th REB, "4n+1=1" is assigned to upper resources, and "4n+3=3" is assigned to lower resources.

Figure 4B:
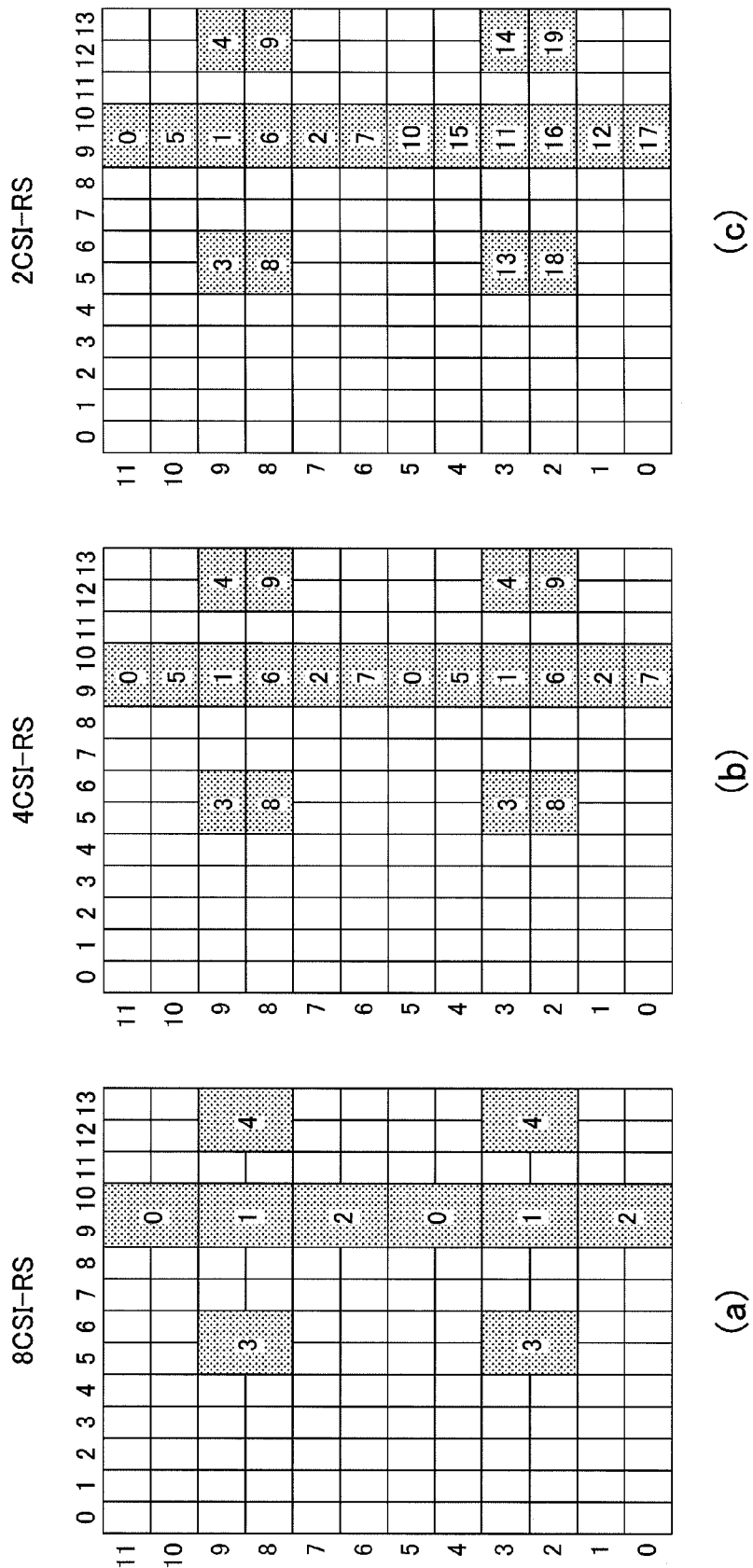
FIG. 4B contains views showing a specific example in which CSI-RS location indexes are determined by applying the method as shown in FIG. 3B.

FIG. 4B shows a specific example for determining CSI-RS location indexes of the numbers of CSI-RS ports being "4" and "2" by applying the method as shown in FIG. 3B. CSI-RS location indexes of 8 CSI-RSs where the number of CSI-RS ports is the maximum are beforehand determined, and are held in the form of a table or the like. Based on the location indexes of 8 CSI-RSs, indexes of the numbers of CSI-RS ports being "4" and "2" are calculated according to the index determination rule as shown in FIG. 3B. The configuration of 8 CSI-RSs in one resource block is the same as the 8 CSI-RS configuration as shown in FIG. 4A.

In the case of 4 CSI-RSs, CSI-RS location indexes are determined based on the CSI-RS location indexes assigned to REBs of 8 CSI-RSs. In the case of 4 CSI-RSs, different CSI-RS location indexes are assigned to upper resources and lower resources in one REB, and in a set of REBs (for example, 1st REB and 4th REB) assigned the same CSI-RS location index in 8 CSI-RSs, the same CSI-RS location indexes (n=0, n+N=5) are assigned also in 4 CSI-RSs.

In the case of 2 CSI-RSs, CSI-RS location indexes are determined based on the CSI-RS location indexes assigned to REBs of 4 CSI-RSs. In the case of 2 CSI-RSs, different CSI-RS location indexes are assigned to upper resources and lower resources in one REB, and also in a set of REBs (for example, 1st REB and 4th REB) assigned the same CSI-RS location indexes in 4 CSI-RSs, different location indexes are assigned. For example, in the 1st REB, "n=0" is assigned to upper resources, and "n+N=5" is assigned to lower resources. In the 4th REB, "n+2N=10" is assigned to upper resources, and "n+3N=15" is assigned to lower resources.

Figure 4C:
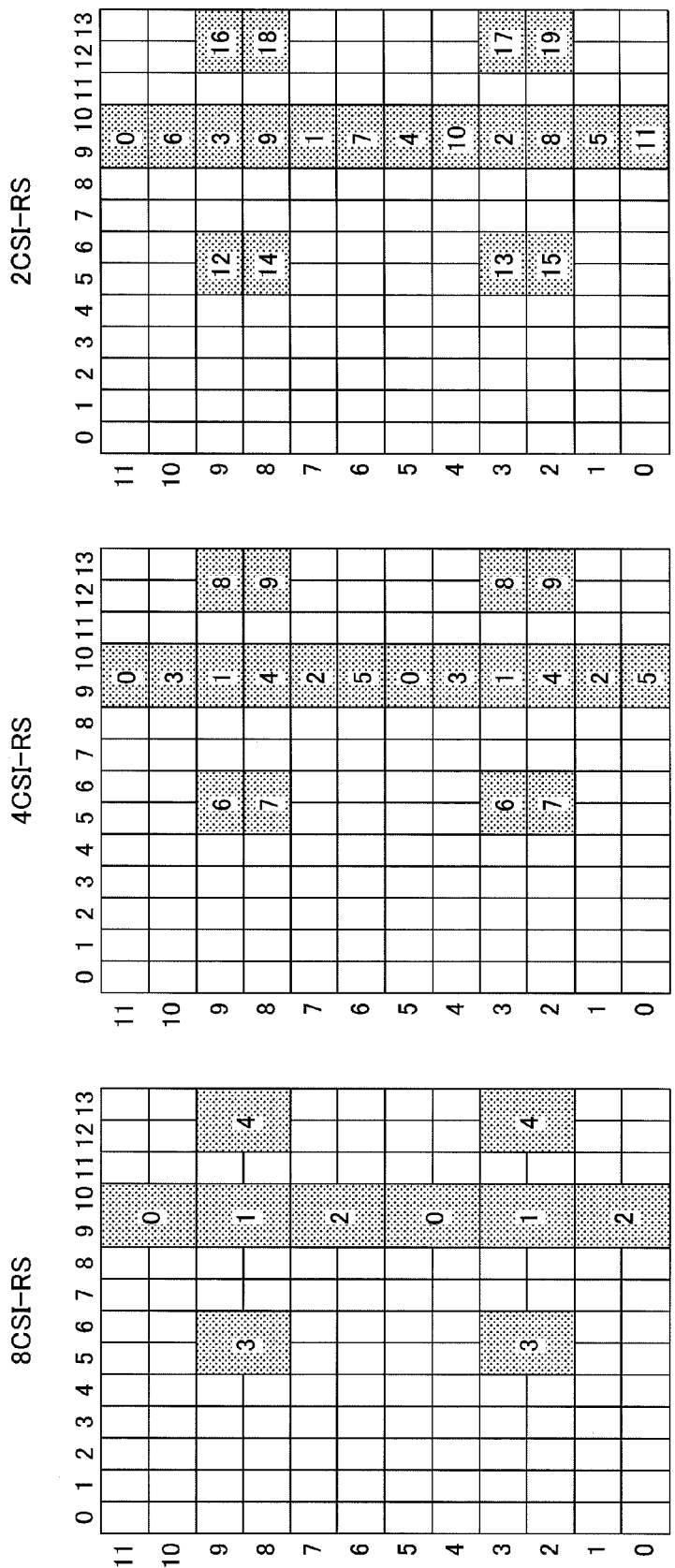
FIG. 4C contains views showing a specific example of CSI-RS location indexes determined with a part of initial CSI-RS location indexes modified.

FIG. 4C shows a specific example of for determining CSI-RS location indexes by further modifying apart of initial CSI-RS location indexes calculated by applying the method as shown in FIG. 3A. In the first stage, location indexes of 4 CSI-RSs are calculated according to the index determination rule as shown in FIG. 3A, based on the location indexes of 8 CSI-RSs with the maximum number of ports. In the second stage, among the location indexes calculated in the first stage, location indexes of from the 1st to 6th REBs located in the 9th and 10th symbol regions are relocated to be equally located in the frequency-index direction in ascending numeric order.

In the third stage, location indexes of 2 CSI-RSs are calculated according to the index determination rule as shown in FIG. 3A. In the fourth stage, among the location indexes calculated in the third stage, location indexes of from the 1st to 6th REBs located in the 9th and 10th symbol regions are relocated to be equally located in the frequency-index direction in ascending numeric order.

For channel estimation using the CSI-RS, location indexes of CSI-RSs determined as described above are signaled in downlink as one of CSI-RS parameters.

At this point, CSI-RS parameters preferably include a transmission cycle (Duty cycle: 5, 10, 20 msec, . . . ) of CSI-RS, transmission power and the number of CSI-RS ports. The CSI-RS parameter may include offset information (subframe offset) as additional information to identify positions of CSI-RSs. Since the offset information (subframe offset) is closely related to the transmission cycle of CSI-RS, it is preferable to notify in the form of combining the offset information and transmission cycle.

The mobile terminal apparatus receives the aforementioned CSI-RS parameters in downlink to demodulate, thereby acquires location indexes of CSI-RSs, receives the CSI-RSs in resources indicated by the CSI-RS location indexes, and is capable of performing channel estimation from the CSI-RS reception results.

As described above, the CSI-RS parameters (CSI-RS location indexes) are included in a broadcast signal, and are notified to the mobile terminal apparatus. Since the CSI-RS location indexes are not bundled with the cell ID, design of the cell ID is not dependent on a location configuration of CSI-RS. In other words, the cell ID is determined based on parameters of the location configuration of CRS and the like, but is not complicated by further considering parameters of CSI-RS. Accordingly, the configuration for identifying positions of CSI-RSs by broadcast is effective in the case of giving a priority to versatility of design in the system, and the like.

However, the present invention does not exclude combinations with the notification method in which CSI-RS location indexes are associated with the cell ID. The invention may enable switching between the method (indirect signaling method) for bundling CSI-RS location indexes with the cell ID to signal and the method (explicit signaling method) for including CSI-RS location indexes in a broadcast signal to signal, in the same method as the CRS index notification method as described above. In the case of applying the hybrid method for enabling the indirect signaling method and the explicit signaling method to be switched, RRC signaling is performed for identification information for indicating whether the method is the indirect signaling method or the explicit signaling method.

Further, in performing CoMP (Coordinated Multiple Point), when the same cell ID is used among a plurality of cells, CSI-RSs collide with one another between cells in locating CSI-RSs in resources for the cell ID. Accordingly, in the case of such a system form, CSI-RSs are located in resources for broadcast. Further, it is possible to use separately so that CSI-RSs are located in resources for the cell ID in a macro-cell, while being located in resources for broadcast in a pico-cell.

Further, the CSI-RS differs from the CRS, and is designed in consideration of performing not only for the serving cell but also for adjacent cells. The reason why channel quality of a plurality of cells is thus measured is to consider transmission and reaction of user data by CoMP. A mobile terminal apparatus transmits the measured CQIs to the base station apparatus of the serving cells and base station apparatuses of the adjacent cells as feedback. The CQI transmitted to the base station apparatus as feedback is used in determining parameters (for example, MCS: Modulation and Coding Scheme) in transmitting user data to the mobile terminal apparatus.

Figure 5:
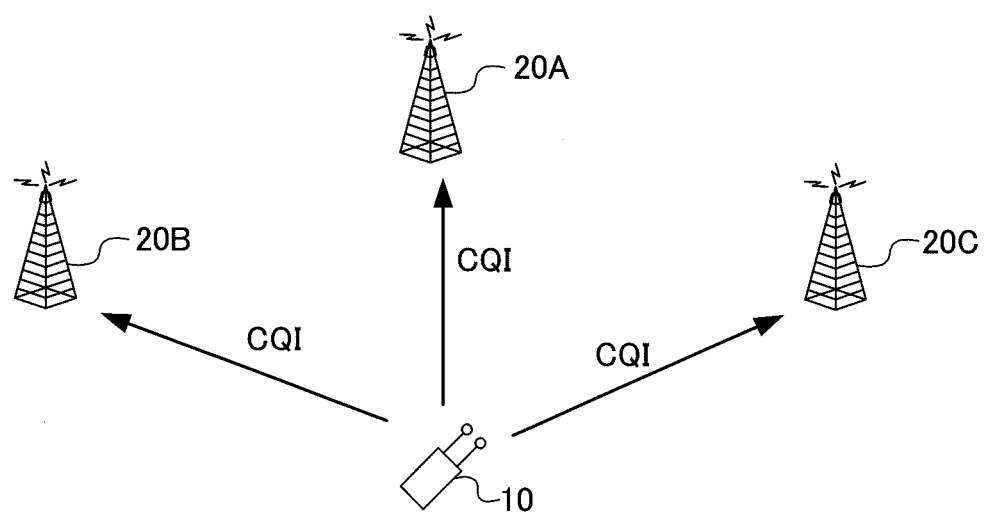
FIG. 5 is an explanatory view of a method of measuring CQIs of adjacent cells.

In this case, parameters of the CSI-RS are communicated between cells, and parameters of positions, transmission power and the like of CSI-RSs of adjacent cells are transmitted from the serving cell to the mobile terminal apparatus. Herein, CQI measurement of adjacent cells will be described with reference to FIG. 5. FIG. 5 is an explanatory view of a method of measuring CQIs of adjacent cells according to this Embodiment of the invention.

As shown in FIG. 5, a base station apparatus 20A installed in the serving cell is connected to base station apparatuses 20B and 20C installed in adjacent cells to be able to transmit and receive CSI-RS parameters. The form of connection among the base station apparatuses 20A, 20B and 20C is not limited particularly, and may be either wired connection or wireless connection. In this system, each of the base station apparatuses 20B and 20C in the adjacent cells transmits parameters of positions (location indexes, subframe offset) of CSI-RSs, and transmission cycle, sequence, transmission power and the like of the CSI-RS to the base station apparatus 20A of the serving cell. The base station apparatus 20A generates a broadcast signal including parameters of the CSI-RSs received from the base station apparatuses 20B and 20C and parameters of the CSI-RSs of the cell of the apparatus 20A to transmit to the mobile terminal apparatus 10.

The parameters of the CSI-RS in the serving cell include the position of the CSI-RS, transmission cycle (duty cycle) of CSI-RS, offset (subframe offset) for a starting position of the transmission cycle of CSI-RS, sequence and transmission power. The parameters of the CSI-RS in the adjacent cell include the adjacent cell ID and the position, sequence and transmission power of the CSI-RS. Using the broadcast signal from the serving cell, the mobile terminal apparatus 10 is capable of identifying the position, sequence and transmission power of the CSI-RS of the adjacent cell, and is thereby capable of measuring the CQI of the adjacent cell.

In addition, in CQI measurement using the CSI-RS, for the purpose of improving accuracy of CQI measurement due to interference from adjacent cells, muting is effective. Muting is performed by setting resources in which the CSI-RS is located in an adjacent cell at blank resources (null).

Muting in CQI measurement using CSI-RSs will be described below with reference to FIG. 6. FIG. 6 is an explanatory view of muting in CQI measurement using CSI-RSs according to this Embodiment of the invention. In addition, in FIG. 6, it is assumed that the cell C1, cell C2 and cell C3 are adjacent to one another. Further, in the following description, the description is given while assuming that resources in which CSI-RSs are located are CSI-RS resources.

Figure 6A:
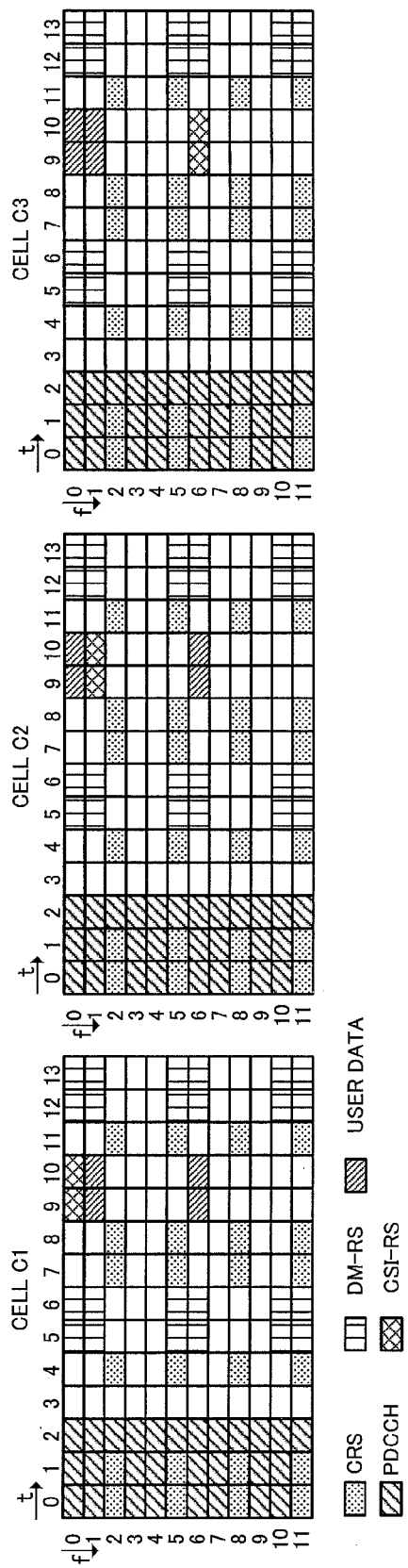
FIG. 6 contains explanatory views of muting in CQI measurement using CSI-RSs.

FIG. 6A shows a state in which muting is not performed. As shown in the figure, in the state in which muting is not performed, in a downlink resource block of the cell C1, user data is located in resources corresponding to CSI-RS resources of adjacent cells C2 and C3. Further, in a downlink resource block of the cell C2, user data is located in resources corresponding to CSI-RS resources of adjacent cells C1 and C3. Still furthermore, in a downlink resource block of the cell C3, user data is located in resources corresponding to CSI-RS resources of adjacent cells C1 and C2. These items of user data constitute interference components of the CSI-RS in each cell, and become a factor for degrading estimation accuracy of channel quality in the mobile terminal apparatus.

Figure 6B:
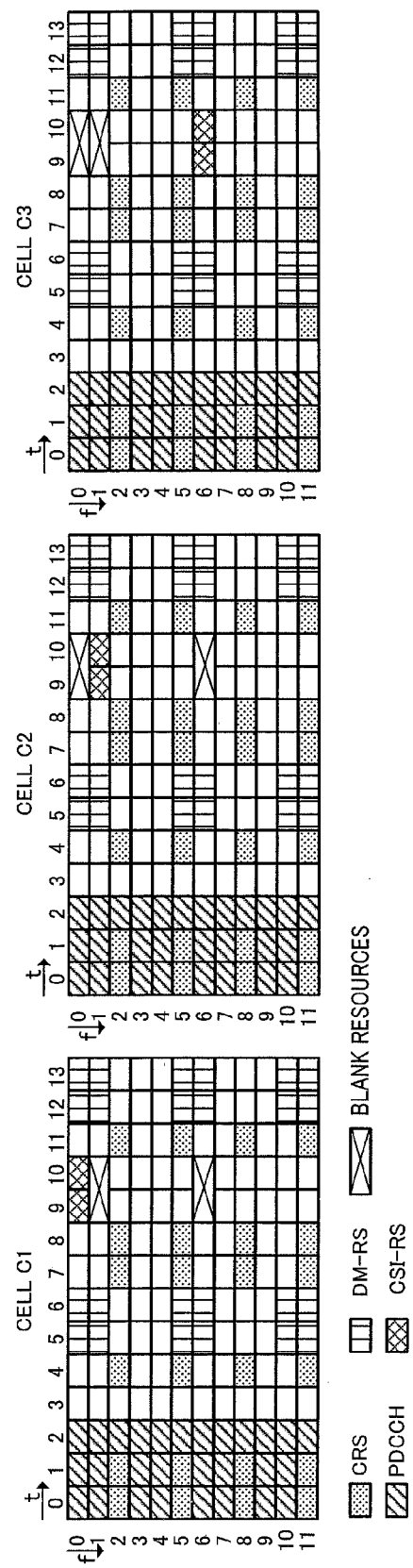

FIG. 6B shows a state in which muting is performed. In muting, to suppress deterioration of estimation accuracy of channel quality caused by the location of user data, resources corresponding to CSI-RS resources of adjacent cells are set at blank resources in which user data is not located. As shown in FIG. 6B, in the downlink resource block of the cell C1, resources corresponding to CSI-RS resources of the cells C2 and C3 are set at blank resources. Further, in the downlink resource block of the cell C2, resources corresponding to CSI-RS resources of the cells C1 and C3 are set at blank resources. Still furthermore, in the downlink resource block of the cell C3, resources corresponding to CSI-RS resources of the cells C1 and C2 are set at blank resources.

Thus, by setting resources corresponding to CSI-RS resources of adjacent cells at blank resources, it is possible to eliminate user data of adjacent cells from interference components of CSI-RSs, and to improve estimation accuracy of channel quality in the mobile terminal apparatus. However, in the case of performing muting, since the data channel is muted to reduce interference to adjacent cells, it is necessary to notify users connecting with the cell about which position is muted.

The mobile terminal apparatus recognizes the presence or absence of muting based on the position information of blank resources notified from the base station apparatus, recognizes that data in the position is non-transmission and thereby recognizes the number of resource elements assigned data.

The position information of blank resources is notified from the base station apparatus to the mobile terminal apparatus on the broadcast channel. For example, the base station apparatus defines pattern indexes indicative of location patterns of CSI-RSs in one resources block by the above-mentioned rule, and notifies the mobile terminal apparatus of the pattern indexes as the position information of blank resources.

Three kinds of muting notification methods will be described next with reference to FIGS. 5A to 7C. FIG. 7A is an explanatory view of a bitmap-based muting resource notification method. The bitmap-based muting resource notification method as shown in the figure is to signal muting position information of a bitmap form that associates the CSI-RS location index numbered by the above-mentioned method with the presence or absence of muting in a one-to-one correspondence. The case where the number of CSI-RS ports is "8" will be described specifically as an example.

In the specific example as shown in FIG. 7A, in the case of 8 CSI-RSs, the case is shown that the CSI-RS is transmitted in resources of the CSI-RS location indexes of "0", "2" and "3", and that resources of the CSI-RS location indexes of "1" and "4" are muted. In this case, in association with CSI-RS location indexes [0, 1, 2, 3, 4], [0, 1, 0, 0, 1] is signaled as the bitmap information. In the bitmap information, the muting position is set for "1", and the position that is not muted is set for "0".

Such a bitmap-based muting resource notification method is capable of supporting various patterns of muting and actualizing high flexibility.

FIG. 7B is an explanatory view of a tree-based muting resource notification method. The tree-based muting resource notification method as shown in the figure is to signal a muting start resource and a muting end resource using CSI-RS location indexes numbered by the above-mentioned method.

In the specific example as shown in FIG. 7B, in the case of 8 CSI-RSs, the case is shown that the CSI-RS is transmitted in resources of the CSI-RS location indexes of "0", "3" and "4", and that resources of the CSI-RS location indexes of "1" and "2" are muted. In this case, the muting start resource is indicated by CSI-RS location index "1", and the muting end resource is indicated by CSI-RS location index "2".

In such a tree-based muting resource notification method, the effect of reducing the number of signaling bits is larger, as the number of contiguous resources targeted for consecutive muting is higher.

FIG. 7C is an explanatory view of a number-based muting resource notification method. The number-based muting resource notification method as shown in the figure is to signal the number of contiguous muting target resources. The muting start position is fixed to CSI-RS location index "0". In addition, as long as the muting start position is fixed or semi-fixed, the position is not limited to the lowest number of "0", and may be started from "1" or another number.

In the specific example as shown in FIG. 7C, in the case of 8 CSI-RSs, the case is shown that the CSI-RS is transmitted in resources of the CSI-RS location indexes of "2", "3" and "4", and that resources of the CSI-RS location indexes of "0" and "1" are muted. In this case, since two contiguous REBS of indexes of "1" to "2" are targeted for muting, the number of muting REBS is two (=2).

In such a number-based muting resource notification method, since it is only required to signal the number of contiguous muting REBS, it is possible to further reduce the number of signaling bits.

FIG. 8 is a table showing the numbers of signaling bits, the numbers of rate matching patterns and the numbers of RE mapping patterns associated with the above-mentioned three muting resource notification methods. Trial calculation is made on each of items such as the number of signaling bits and the number of patterns for each of 2 CSI-RSs, 4 CSI-RSs and 8 CSI-RSs. The number-based muting resource notification method is the method with the lowest number of signaling bits, but the number of RE mapping patterns is the lowest, and therefore, it is understood that this method lacks flexibility.

Further, the tree-based muting resource notification method (FIG. 7B) and the number-based muting resource notification method (FIG. 7C) have high compatibility with CSI-RS location indexes numbered by the methods as shown in FIGS. 4A and 4B. For example, in the case of 4 CSI-RSs as shown in FIG. 4A(b), the CSI-RS location indexes are aligned in ascending numeric order. Further, in the case of 2 CSI-RSs as shown in FIG. 4A(c), even numbers and odd numbers are separate, but the CSI-RS location indexes are aligned in ascending numeric order. As in the tree-based (including number-based) muting resource notification method, by combining with the method of designating the CSI-RS location indexes by continuous numbers, it is possible to designate muting resources sequentially from the low number.

As shown in FIG. 7A, for example, in the cell C1, the base station apparatus notifies the mobile terminal apparatus of CSI-RS location indexes "0", "2" and "3" as the position information of the CSI-RSs, and of indexes "1" and "4" as the position information of blank resources, by any one of the signaling methods as shown in FIGS. 7A to 7C. The mobile terminal apparatus is notified of the blank resources, and is thereby capable of demodulating user data while eliminating the effect of the blank resources. Thus, according to the first muting notification method, it is possible to notify the mobile terminal apparatus of blank resources with the simplified configuration.

In addition, this Embodiment describes the configuration in which the base station apparatus notifies the mobile terminal apparatus of pattern indexes as the position information of blank resources, but the invention is not limited to this configuration. The position information of blank resources is only required to be information for enabling the position of blank resource to be identified, and for example, may be address information in a resource block. Further, when pattern indexes indicative of a location pattern of resources for the cell ID are defined in a resource block, such a configuration may be adopted that the cell ID is notified as the position information of blank resources.

Figure 9:
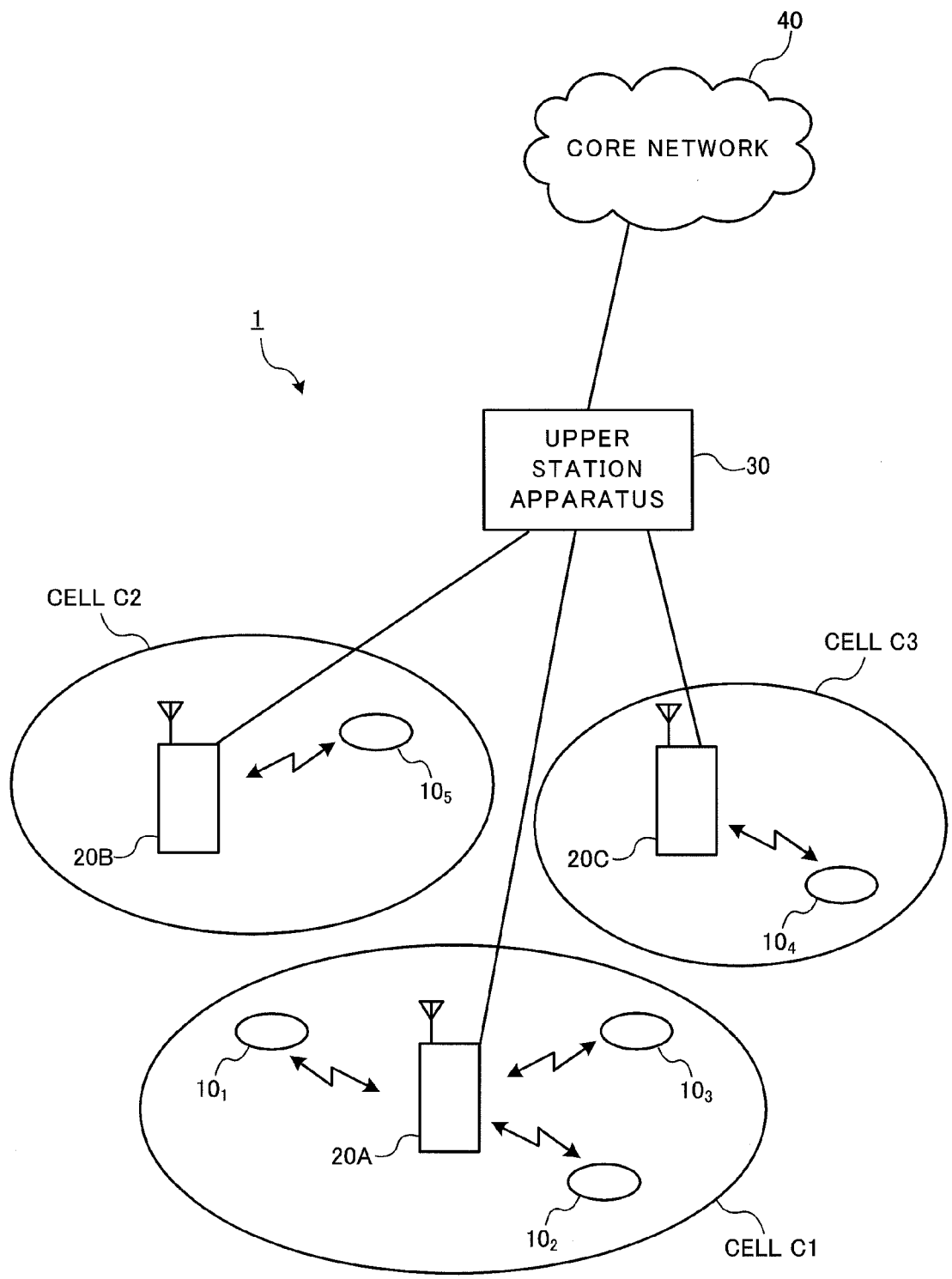
FIG. 9 is an explanatory view of a configuration of a mobile communication system.

A radio communication system according to the Embodiment of the invention will specifically be described herein. FIG. 9 is an explanatory view of a system configuration of the radio communication system according to this Embodiment. In addition, the radio communication system as shown in FIG. 9 is a system including the LTE system or SUPER 3G, for example. In the radio communication system is used carrier aggregation for integrating a plurality of base frequency blocks with the system band of the LTE system as one unit. Further, the radio communication system may be called IMT-Advanced or may be called 4G.

As shown in FIG. 9, the radio communication system 1 includes the base station apparatuses 20A, 20B and 20C and a plurality of mobile terminal apparatuses 10 ($10_1$, $10_2$, $10_3$, . . . , $10_n$, n is an integer where n>0) that communicate with the base station apparatuses 20A, 20B and 20C and is comprised thereof. The base station apparatuses 20A, 20B and 20C are connected to an upper station apparatus 30, and the upper station apparatus 30 is connected to a core network 40. The mobile terminal apparatuses 10 are capable of communicating with the base station apparatuses 20A, 20B and 20C in cells C1, C2 and C3, respectively. In addition, for example, the upper station apparatus 30 includes an access gateway apparatus, radio network controller (RNC), mobility management entity (MME), etc., but is not limited thereto.

Each of the mobile terminal apparatuses ($10_1$, $10_2$, $10_3$, . . . , $10_n$) includes an LTE terminal and LTE-A terminal, and is described as a mobile terminal apparatus 10 unless otherwise specified in the following description. Further, for convenience in description, the description is given while assuming that equipment that performs radio communications with the base station apparatuses 20A, 20B and 20C is the mobile terminal apparatus 10, and more generally, the equipment may be user equipment (UE) including mobile terminal apparatuses and fixed terminal apparatuses.

In the radio communication system 1, as a radio access scheme, OFDMA (Orthogonal Frequency Division Multiple Access) is applied in downlink, while SC-FDMA (Single-Carrier Frequency Division Multiple Access) is applied in uplink, but the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system.

The downlink communication channels have the PDSCH (Physical Downlink Shared CHannel) as a downlink data channel shared among the mobile terminal apparatuses 10, and downlink L1/L2 control channels (PDCCH, PCFICH, PHICH). Transmission data and higher control information is transmitted on the PDSCH. Scheduling information of the PDSCH and PUSCH and the like is transmitted on the PDCCH. The number of OFDM symbols used in the PDCCH is transmitted on the PCFICH (Physical Control Format Indicator CHannel). ACK/NACK of HARQ for the PUSCH is transmitted on the PHICH.

The uplink control channels have the PUSCH as an uplink data channel shared among the mobile terminal apparatuses, and the PUCCH (Physical Uplink Control CHannel) that is a control channel in uplink. Transmission data and higher control information is transmitted on the PUSCH. Further, on the PUCCH is transmitted downlink radio quality information (CQI: Channel Quality Indicator), ACK/NACK and the like.

Figure 10:
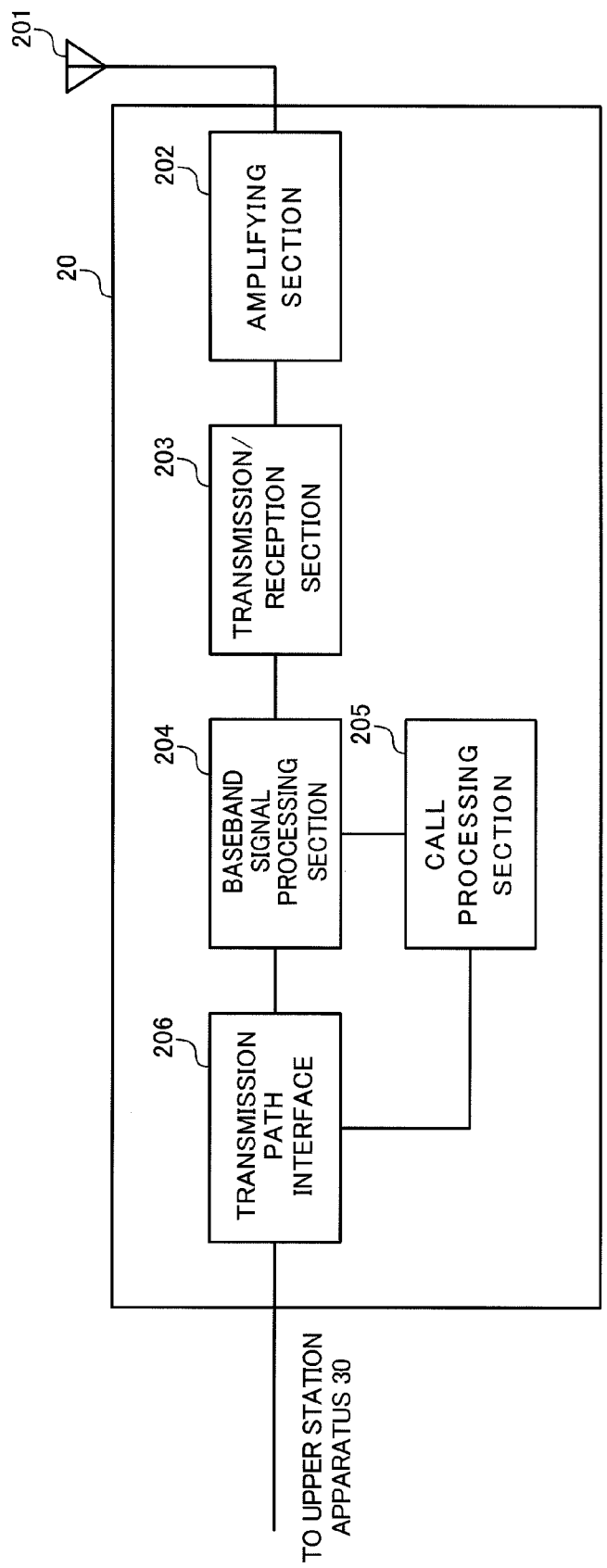
FIG. 10 is an explanatory view of an entire configuration of a base station apparatus.

Referring to FIG. 10, described is the entire configuration of the base station apparatus according to this Embodiment. In addition, the base station apparatuses 20A, 20B and 20C have the same configuration, and therefore, are described as the base station apparatus 20. The base station apparatus 20 is provided with a transmission/reception antenna 201, amplifying section 202, transmission/reception section (transmission section) 203, baseband signal processing section 204, call processing section 205 and transmission path interface 206. The transmission data to transmit from the base station apparatus 20 to the mobile terminal apparatus 10 in downlink is input to the baseband signal processing section 204 via the transmission path interface 206 from the upper station apparatus 30.

The baseband signal processing section 204 performs, on the downlink data channel signal, PDCP layer processing, segmentation and concatenation of the transmission data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform (IFFT) processing and precoding processing. Further, on a signal of the Physical Downlink Control Channel that is a downlink control channel, the section 204 also performs transmission processing of channel coding, IFFT and the like.

Further, the baseband signal processing section 204 notifies mobile terminal apparatuses 10 connected to the same cell of control information for each mobile terminal apparatus to perform radio communications with the base station apparatus 20 on the broadcast channel. For example, the broadcast information for communications in the cell includes the system bandwidth in uplink or downlink, identification information (Root Sequence Index) of a root sequence to generate a signal of a random access preamble on the PRACH (Physical Random Access CHannel), etc.

The transmission/reception section 203 converts the frequency of the baseband signal output from the baseband signal processing section 204 into a radio frequency band. The amplifying section 202 amplifies a transmission signal subjected to frequency conversion to output to the transmission/reception antenna 201.

Meanwhile, with respect to signals transmitted from the mobile terminal apparatus 10 to the base station apparatus in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer on the transmission data included in the baseband signal received in uplink. The decoded signal is transferred to the upper station apparatus 30 via the transmission path interface 206.

The call processing section 205 performs call processing such as setting and release of the communication channel, status management of the base station apparatus 20, and management of radio resources.

Figure 11:
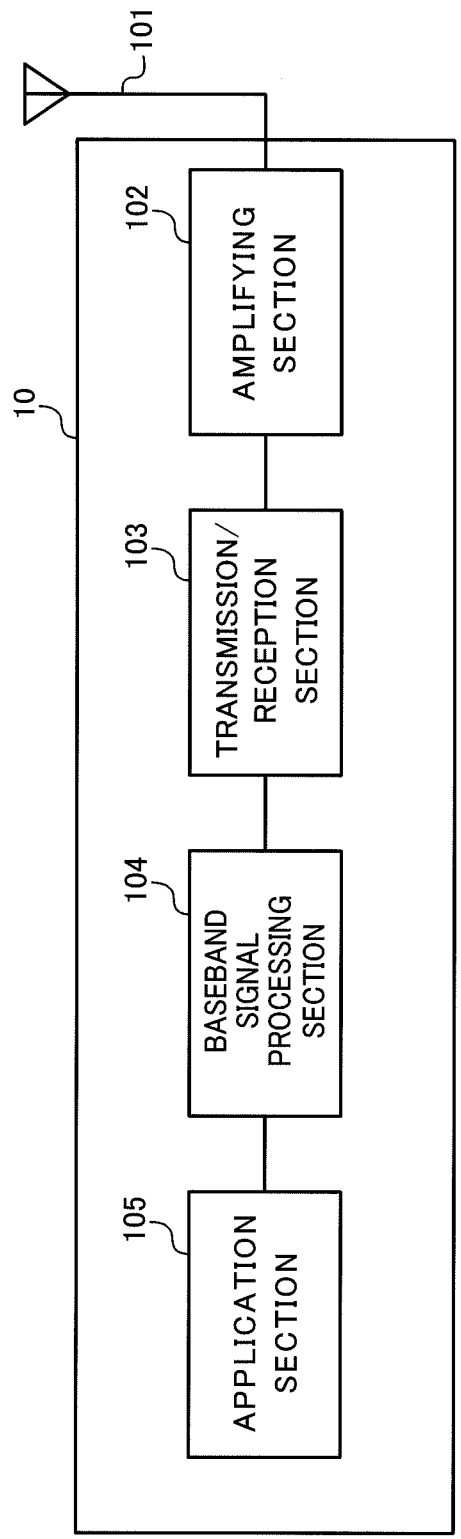
FIG. 11 is an explanatory view of an entire configuration of a mobile terminal apparatus.

Referring to FIG. 11, described is the entire configuration of the mobile terminal apparatus 10 according to this Embodiment. The LTE terminal and the LTE-A terminal have the same configuration of principal part of hardware, and are not distinguished to describe. The mobile terminal apparatus 10 is provided with a transmission/reception antenna 101, amplifying section 102, transmission/reception section (reception section) 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, the transmission data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to transmission data in uplink, the application section 105 inputs the data to the baseband signal processing section 104 using maximum two transport blocks. The baseband signal processing section 104 performs mapping processing to each layer of the transport block, transmission processing of retransmission control (HARQ), channel coding, DFT processing and IFFT processing. The transmission/reception section 103 converts the frequency of the baseband signal output from the baseband signal processing section 104 into a radio frequency band. Then, the signal is amplified in the amplifying section 102, and is transmitted from the transmission/reception antenna 101.

Figure 12:
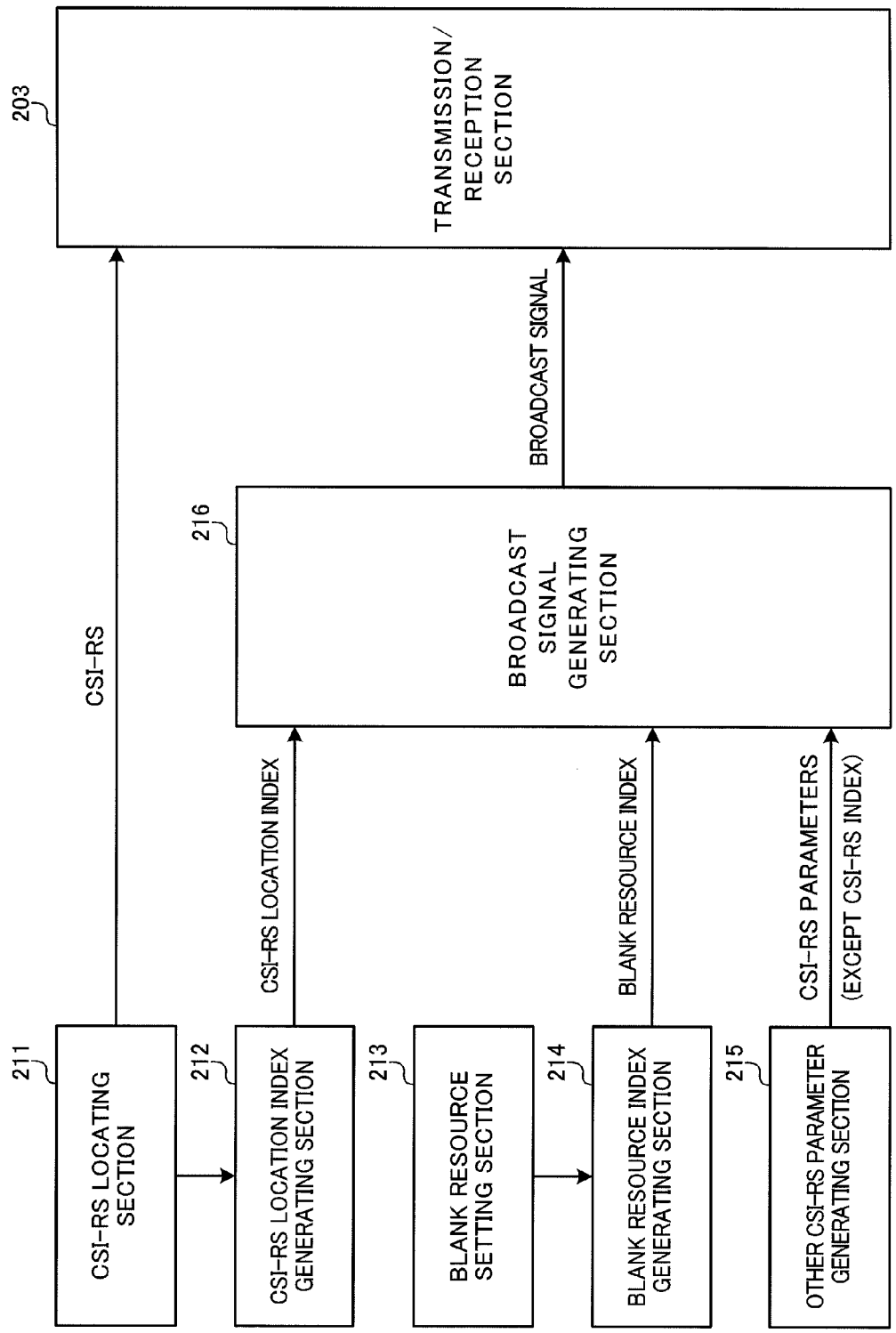
FIG. 12 is an explanatory view of functional blocks for the base station apparatus to cause the mobile terminal apparatus to measure CQI.

Referring to FIG. 12, described are functional blocks for the base station apparatus to cause the mobile terminal apparatus to measure the CQI. FIG. 12 is an explanatory view of functional blocks for the base station apparatus to cause the mobile terminal apparatus to measure the CQI. In addition, each functional block in FIG. 12 is mainly of processing content of the baseband processing section. Further, the functional blocks shown in FIG. 12 are simplified to describe the invention, and are assumed to have the configuration that the baseband processing section normally has.

As shown in FIG. 12, the base station apparatus 20 has a CSI-RS locating section (locating section) 211, CSI-RS location index generating section 212 (index generating section) that generates CSI-RS location indexes according to the rule as shown in FIG. 3A or 3B, a blank resource setting section 213, a blank resource index generating section 214 that signals blank resource indexes by the signaling method as shown in FIG. 7A, 7B or 7C, a CSI-RS parameter generating section 215 that generates CSI-RS parameters (transmission cycle, subframe offset, transmission power, etc.) except CSI-RS location indexes, a broadcast signal generating section 216 and the transmission/reception section 203.

The CSI-RS locating section 211 locates CSI-RSs in broadcast resources in a resource block corresponding to the number of CSI-RS ports according to either pattern as shown in FIG. 4A or 4B. The CSI-RS location index generating section 212 generates indexes associated with the resources in which the CSI-RS locating section 211 locates the CSI-RSs. Therefore, the section 211 holds CSI-RS location indexes (FIG. 4A(a)) of 8 CSI-RSs as basic pattern indexes, and corresponding to the number of CSI-RS ports, obtains CSI-RS location indexes of CSI-RSs of the resources from the basic pattern indexes by the method as shown in FIG. 3A, 3B or 3C. The CSI-RS location indexes of 4 CSI-RSs or 2 CSI-RSs generated by the method as shown in FIG. 3A, 3B or 3C are of nest structure such that the index pattern of the relatively low number of CSI-RS ports is a subset of the index pattern of the relatively high number of CSI-RS ports. The CSI-RS location indexes generated in the CSI-RS location index generating section 212 are input to the broadcast signal generating section 216 as one of CSI-RS parameters.

The blank resource setting section 213 sets blank resources on resources corresponding to CSI-RS resources in which CSI-RSs are located in an adjacent cell. In addition, in this Embodiment, the blank resources may be resources to which any transmission signal is not assigned at all, or may be defined as resources to which data is assigned to the extent of not interfering with the CSI-RS in the adjacent cell. Further, the blank resources may be defined as resources that are transmitted with transmission power of the degree of not interfering with the CSI-RS in the adjacent cell.

The blank resource index generating section 214 generates blank resource index information for enabling the blank resource indexes to be identified by any one of the methods in FIGS. 7A, 7B and 7C. When the mobile terminal apparatus 10 is notified of the blank resource index information, resources except CSI-RS resources are recognized as blank resources on the mobile terminal apparatus 10 side.

The blank resource index information generated in the blank resource index generating section 214 is input to the broadcast signal generating section 216.

The CSI-RS parameter generating section 215 generates parameters of sequence, transmission power and the like of the CSI-RS except the position of the CSI-RS. Described herein is signaling of the transmission cycle (duty cycle) of CSI-RS and subframe offset. Since the CSI-RS is not transmitted for each subframe, the transmission cycle of CSI-RS is signaled as one of CSI-RS parameters. As the transmission cycle of CSI-RS, any of 5, 10, 20, 40, 80 and 160 msec may be selected and notified. Further, an offset (subframe offset) may be added to a CSI-RS transmission start position in a subframe in which the CSI-RS is transmitted. The offset value is in the relationship of not exceeding the transmission cycle of CSI-RS, and therefore, it is desired to combine the transmission cycle of CSI-RS with the subframe offset. FIG. 14 shows the correspondence relationship between the transmission cycle of CSI-RS and the subframe offset. The CSI-RS parameter generating section 215 generates the transmission cycle of CSI-RS and the subframe offset combined as shown in FIG. 14 as CSI-RS parameters.

Further, when PDSCH muting is applied, it is possible to boost transmission power of the CSI-RS using transmission power of resource elements targeted for muting. Therefore, when transmission power substituted for that of resource elements targeted for muting is signaled as a power offset with respect to transmission power of the CSI-RS, it is possible to boost transmission power of the CSI-RS. The CSI-RS parameter generating section 215 generates a power offset with respect to transmission power of the CSI-RS as a CSI-RS parameter.

Meanwhile, unless the mobile terminal apparatus is notified of the number (8, 4, 2) of the CSI-RS ports, the mobile terminal apparatus is not capable of performing CQI measurement using CSI-RSs. The CSI-RS parameter generating section 215 generates the number of (8, 4, 2) of the CSI-RS ports as a CSI-RS parameter.

The broadcast signal generating section 216 includes the CSI-RS location indexes, blank resource index information, and the other CSI-RS parameters to generate a broadcast signal. In this case, the broadcast signal generating section 216 includes not only the CSI-RS parameters in the cell but also CSI-RS parameters of the adjacent cell received via the transmission/reception section 203 to generate a broadcast signal. The transmission/reception section 203 transmits the CSI-RSs and broadcast signal to the mobile terminal apparatus 10. Further, in the case of applying the hybrid method for enabling the indirect signaling method and the explicit signaling method to be switched as described above, RRC signaling is performed for identification information for indicating whether the method is the indirect signaling method or the explicit signaling method.

Figure 13:
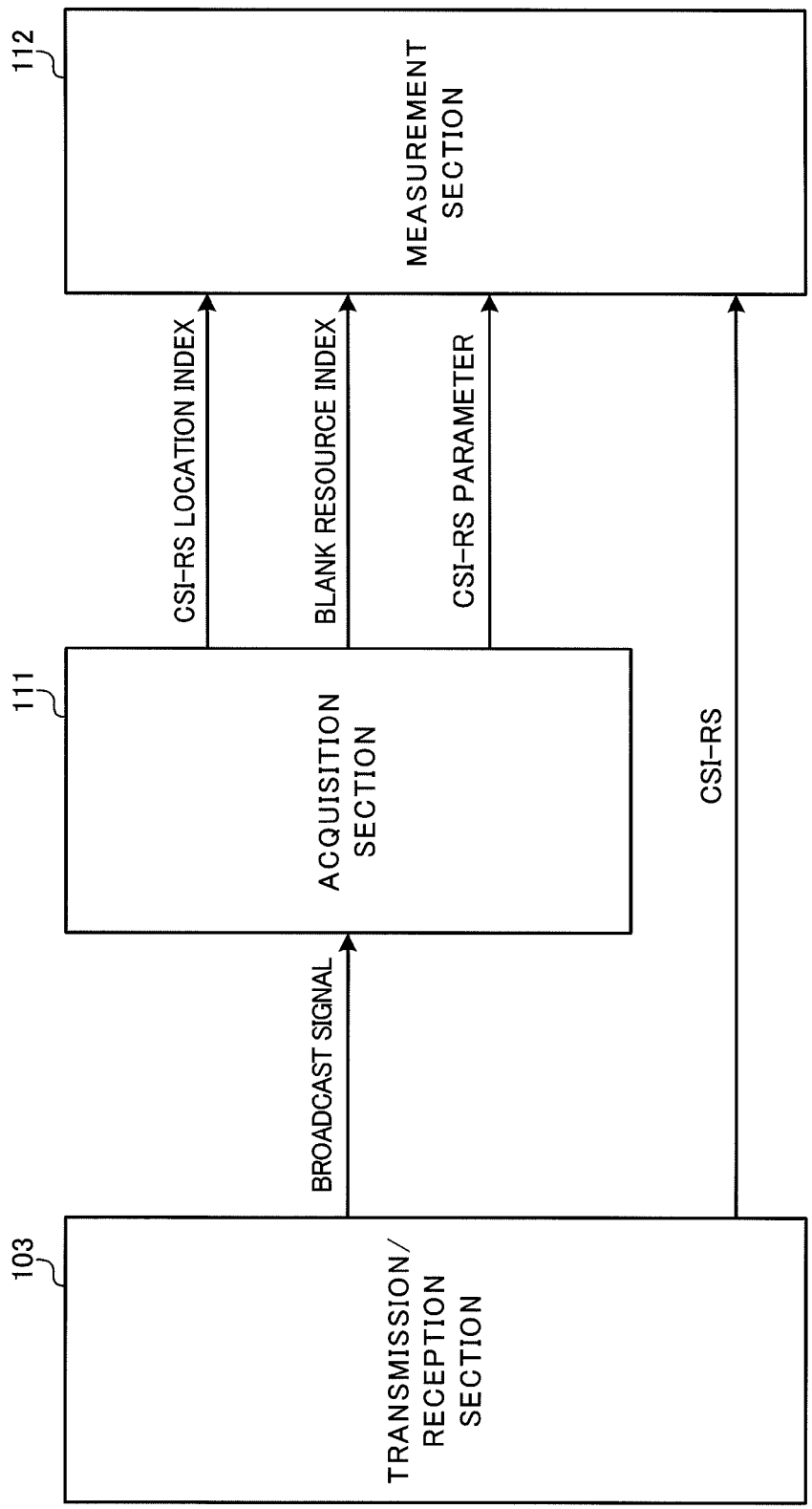
FIG. 13 is an explanatory view of functional blocks for the mobile terminal apparatus to measure CQI.

Referring to FIG. 13, described are functional blocks for the mobile terminal apparatus to measure the CQI. FIG. 13 is an explanatory view of functional blocks for the mobile terminal apparatus to measure the CQI. In addition, each functional block in FIG. 13 is mainly of processing content of the baseband processing section. Further, the functional blocks shown in FIG. 13 are simplified to describe the invention, and are assumed to have the configuration that the baseband processing section normally has.

As shown in FIG. 13, the mobile terminal apparatus 10 has the transmission/reception section 103, acquisition section 111 and measurement section 112. The transmission/reception section 103 receives CSI-RSs and broadcast signal from the base station apparatus 20. The acquisition section 111 demodulates the broadcast signal, analyzes information of the signal, and thereby acquires CSI-RS parameters such as CSI-RS location indexes, blank resource indexes, transmission power and the like.

The measurement section 112 measures CQIs based on the CSI-RS parameters of the serving cell and the adjacent cell. The measurement section 112 measures the CQIs of the serving cell and the adjacent cell from the parameters of position information, sequence, transmission power and like of CSI-RSs.

Further, the measurement section 112 measures the CQIs while considering interference components of muted resources. In this case, the measurement section 112 recognizes that resources indicated by blank resource indexes are set as blank resources except CSI-RS resources in all the other cells. Therefore, the measurement section 112 measures the CQI in consideration of interference components of blank resources, while recognizing that blank resources of the other cells are set on resources corresponding to CSI-RS resources of the serving cell.

As described above, according to the base station apparatus 20 according to this Embodiment, for indexes of CSI-RSs located in broadcast resources, CSI-RS location indexes of the lower numbers of CSI-RS ports are generated using CSI-RS location indexes of the high number of CSI-RS ports, it is thereby possible to eliminate index tables of the numbers of CSI-RS ports of "4" and "2", and it is thus possible to signal the CSI-RS location indexes with high efficiency. Further, by locating CSI-RS location indexes in broadcasts resources to signal, the location configuration of CSI-RSs is not dependent on design of the cell ID, and it is possible to enhance design versatility in the system.

Further, in this Embodiment as described above, in the case where CSI-RSs are located in broadcast resources, the invention adopts the configuration in which the base station apparatus simultaneously notifies a plurality of mobile terminal apparatuses of the position information of CSI-RSs using a broadcast signal, but the invention is not limited to the configuration. As a substitute for the configuration in which the base station apparatus simultaneously notifies mobile terminal apparatuses of the position information of CSI-RSs using a broadcast signal, another configuration for notifying mobile terminal apparatuses of CSI-RSs individually may be adopted. Accordingly, the broadcast resources are not limited to the configuration for simultaneously notifying mobile terminal apparatuses of the position information of CSI-RSs using a broadcast signal, and also used in notifying the mobile terminal apparatuses of the position information of CSI-RSs individually.

Furthermore, in the above-mentioned Embodiment, the mobile terminal apparatus adopts the configuration in which the acquisition section acquires the position information of blank resources from a broadcast signal, but is not limited to this configuration. The mobile terminal apparatus may adopt another configuration in which the position information of blank resources is acquired by a functional block except the acquisition section, for example, the measurement section.

The present invention is not limited to the above-mentioned Embodiment, and is capable of being carried into practice with various modifications thereof. For example, without departing from the scope of the invention, assignment positions of CSI-RSs, the number of processing sections, processing procedures, and the number of CSI-RSs in the above-mentioned description are capable of being carried into practice with modifications thereof as appropriate. Moreover, the invention is capable of being carried into practice with modifications thereof as appropriate without departing from the scope of the invention.

The present application is based on Japanese Patent Application No. 2010-181867 filed on Aug. 16, 2010, entire content of which is expressly incorporated by reference herein.

The invention claimed is:

1. A base station apparatus comprising:
a locating section that uses a processor to locate a CSI-RS (Channel State Information-Reference Signal) in any resource elements of CSI-RS resources defined to transmit the CSI-RS, the CSI-RS being a reference signal for downlink for which CSI-RS location indexes are defined associated with each number of CSI-RS ports of 2, 4, and 8;
an index generating section that uses the processor to output a CSI-RS location index corresponding to the resource elements of the CSI-RS resources where the CSI-RS is located by the locating section; and
a transmission section that transmits the CSI-RS location indexes output from the index generating section to a mobile terminal apparatus,
wherein the CSI-RS location indexes are defined associated with the number of CSI-RS ports so that an index pattern of the number of CSI-RS ports of "4" is a subset of an index pattern of the number of CSI-RS ports of "8", and an index pattern of the number of CSI-RS ports of "2" is a subset of the index pattern of the number of CSI-RS ports of "4", and the index pattern comprised of two CSI-RS location indexes "n" and "n+N" associated with the number of CSI-RS ports of "4" is derived from one basic index "n" associated with the number of CSI-RS ports of "8", and the index pattern comprised of four CSI-RS location indexes including the two CSI-RS location indexes "n" and "n+N" associated with the number of CSI-RS ports of "2" is derived from the CSI-RS location indexes "n" and "n+N".

2. The base station apparatus according to claim 1, wherein the four CSI-RS location indexes of the index pattern associated with the number of CSI-RS ports of "2" derived from the CSI-RS location indexes "n" and "n+N" are CSI-RS location indexes of "n", "n+N", "n+2N" and "n+3N".

3. The base station apparatus according to claim 2, wherein the transmission section simultaneously transmits position information of the CSI-RS to a plurality of mobile terminal apparatuses using a broadcast signal.

4. The base station apparatus according to claim 2, further comprising:
a blank resource setting section that sets resources in which the CSI-RS is located in an adjacent area at blank resources,
wherein the transmission section transmits position information of the blank resources to the mobile terminal apparatus.

5. The base station apparatus according to claim 1, wherein the transmission section simultaneously transmits position information of the CSI-RS to a plurality of mobile terminal apparatuses using a broadcast signal.

6. The base station apparatus according to claim 1, further comprising:
a blank resource setting section that uses the processor to set resources in which the CSI-RS is located in an adjacent area at blank resources,
wherein the transmission section transmits position information of the blank resources to the mobile terminal apparatus.

7. The base station apparatus according to claim 6, wherein the transmission section transmits, to the mobile terminal apparatus, bitmap information indicative of the blank resources in a bitmap form associated with the resources for CSI-RS.

8. The base station apparatus according to claim 6, wherein the transmission section generates position information indicative of a start position and an end position of the blank resources using CSI-RS location indexes generated in the index generating section, and transmits the position information to the mobile terminal apparatus.

9. The base station apparatus according to claim 6, wherein the transmission section transmits a contiguous number of the blank resources contiguous in the resources for CSI-RS to the mobile terminal apparatus as the position information of the blank resources.

10. A signaling method of CSI-RS (Channel State Information-Reference Signal), comprising:
in a base station apparatus,
locating the CSI-RS in any resource elements of CSI-RS resources defined to transmit the CSI-RS, the CSI-RS being a reference signal for downlink for which CSI-RS location indexes are defined associated with each number of CSI-RS ports of 2, 4, and 8;
outputting a CSI-RS location index corresponding to the resource elements of the CSI-RS resources where the CSI-RS is located; and
transmitting the output CSI-RS location index to a mobile terminal apparatus,
wherein the CSI-RS location indexes are defined associated with the number of CSI-RS ports so that an index pattern of the number of CSI-RS ports of "4" is a subset of an index pattern of the number of CSI-RS ports of "8", and an index pattern of the number of CSI-RS ports of "2" is a subset of the index pattern of the number of CSI-RS ports of "4", and the index pattern comprised of two CSI-RS location indexes "n" and "n+N" associated with the number of CSI-RS ports of "4" is derived from one basic index "n" associated with the number of CSI-RS ports of "8", and the index pattern comprised of four CSI-RS location indexes including the two CSI-RS location indexes "n" and "n+N" associated with the number of CSI-RS ports of "2" is derived from the CSI-RS location indexes "n" and "n+N".

* * * * *